US012145536B2

(12) United States Patent
Godet et al.

(10) Patent No.: US 12,145,536 B2
(45) Date of Patent: Nov. 19, 2024

(54) METHOD FOR ACTIVATING A MOTOR VEHICLE FUNCTION AND ASSOCIATED ACTIVATION DEVICE

(71) Applicant: Continental Automotive Technologies GmbH, Hannover (DE)

(72) Inventors: Sylvain Godet, Toulouse (FR); Rachid Benbouhout, Toulouse (FR); Alexis Morin, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/272,657

(22) PCT Filed: Jan. 27, 2022

(86) PCT No.: PCT/EP2022/051916
§ 371 (c)(1),
(2) Date: Jul. 17, 2023

(87) PCT Pub. No.: WO2022/162071
PCT Pub. Date: Aug. 4, 2022

(65) Prior Publication Data
US 2024/0034274 A1 Feb. 1, 2024

(30) Foreign Application Priority Data
Jan. 29, 2021 (FR) ........................................ 2100852

(51) Int. Cl.
*B60R 25/31* (2013.01)
*B60R 25/24* (2013.01)
(Continued)

(52) U.S. Cl.
CPC .............. *B60R 25/31* (2013.01); *B60R 25/24* (2013.01); *G01S 7/006* (2013.01); *G01S 7/412* (2013.01);
(Continued)

(58) Field of Classification Search
CPC ......... B60R 25/31; B60R 25/24; G01S 7/006; G01S 7/412; G01S 13/0209; G01S 13/765; G01S 13/872; G01S 2013/9316
See application file for complete search history.

(56) References Cited

U.S. PATENT DOCUMENTS 10,839,627 B2 * 11/2020 Golsch .................... G07C 9/28
2015/0009062 A1 1/2015 Herthan
(Continued)

FOREIGN PATENT DOCUMENTS

GB 2547475 A 8/2017
JP 2016035195 A 3/2016
(Continued)

OTHER PUBLICATIONS

International Search Report and Written Opinion for International Application No. PCT/EP2022/051916, dated May 31, 2022, 7 pages.
(Continued)

*Primary Examiner* — Timothy A Brainard
(74) *Attorney, Agent, or Firm* — Buchanan Ingersoll & Rooney PC

(57) ABSTRACT

A method for activating a function of a motor vehicle by an activation device, using a portable access device carried by a user. The activation of the function being initiated by detection of the presence of the user in a predetermined area around the vehicle, and in accordance with a result of authentication of the portable access device by the vehicle, the method including: A) the detection of the presence of the user in the predetermined area is implemented by a predetermined profile of ultra-wideband radiation emitted by the activation device in what is known as an ultra-wideband reflective mode and reflected by the user, and B) the authentication of the portable device is implemented by a bidirectional ultra-wideband communication between the activation device and the portable access device.

10 Claims, 3 Drawing Sheets

(51) Int. Cl.
  *G01S 7/00* (2006.01)
  *G01S 7/41* (2006.01)
  *G01S 13/02* (2006.01)
  *G01S 13/76* (2006.01)
  *G01S 13/87* (2006.01)
  *G01S 13/931* (2020.01)

(52) U.S. Cl.
  CPC ........ *G01S 13/0209* (2013.01); *G01S 13/765* (2013.01); *G01S 13/872* (2013.01); *G01S 2013/9316* (2020.01)

(56) References Cited

U.S. PATENT DOCUMENTS

| | | | | |
|---|---|---|---|---|
| 2018/0374290 | A1* | 12/2018 | Björkengren | H04W 12/08 |
| 2019/0263358 | A1* | 8/2019 | Kusumoto | G01S 13/003 |
| 2020/0122686 | A1* | 4/2020 | Siswick | B60R 25/01 |
| 2020/0232262 | A1* | 7/2020 | Marlia | B60R 25/01 |
| 2020/0363524 | A1 | 11/2020 | Yoon et al. | |
| 2021/0051483 | A1* | 2/2021 | Soryal | G07C 9/00309 |
| 2022/0109561 | A1 | 4/2022 | Yang et al. | |
| 2022/0250584 | A1 | 8/2022 | Waszak et al. | |

FOREIGN PATENT DOCUMENTS

| | | |
|---|---|---|
| WO | 2020253856 A1 | 12/2020 |
| WO | 2021008930 A1 | 1/2021 |

OTHER PUBLICATIONS

International Search Report and Written Opinion for International Application No. PCT/EP2022/051916, dated May 31, 2022, 10 pages (French).

French Search Report for French Application No. 889395, dated Oct. 18, 2021 with translation, 10 pages.

English Translation of the Written Opinion for International Application No. PCT/EP2022/051916, mailed May 31, 2022, 4 pages.

* cited by examiner

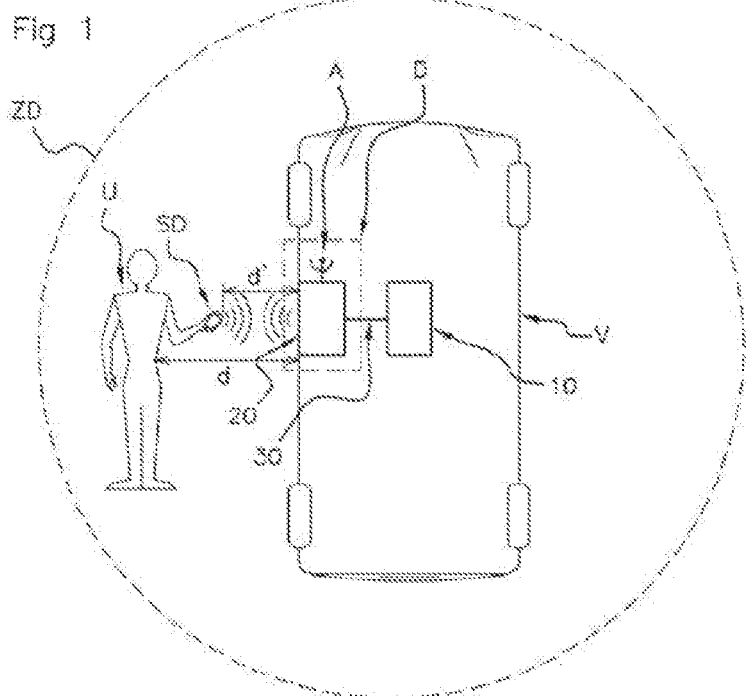
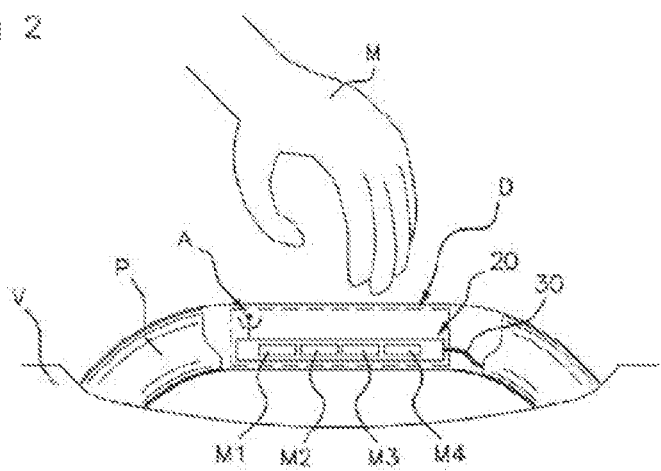

METHOD FOR ACTIVATING A MOTOR VEHICLE FUNCTION AND ASSOCIATED ACTIVATION DEVICE

CROSS REFERENCE TO RELATED APPLICATIONS

This application is the U.S. National Phase Application of PCT International Application No. PCT/EP2022/051916, filed Jan. 27, 2022, which claims priority to French Patent Application No. 2100852, filed Jan. 29, 2021, the contents of such applications being incorporated by reference herein.

FIELD OF THE INVENTION

The present invention relates to the field of motor vehicles and more particularly concerns a method for activating a function of a motor vehicle. The invention is applicable, in particular, to the function of locking and unlocking the openable body sections of a motor vehicle.

BACKGROUND OF THE INVENTION

In a motor vehicle, it is known to use presence detection devices to detect the presence of a user's hand or foot and thus enable the locking or unlocking of some or all of the openable body sections of the vehicle, for example the doors or the trunk. By way of example, the detection of the presence of a user's hand on or in front of a door handle, combined with the recognition of an identifier of a hands-free access device carried by this user, enables these openable body sections to be locked and unlocked.

What is known as a "hands-free" access system for accessing a motor vehicle allows an authorized user to lock and/or unlock the opening elements of his vehicle without having to physically press buttons on a key. For this purpose, the vehicle identifies a portable item of equipment such as a fob or remote control carried by the user or even a key, and if the fob or the remote control or else the key is located in a predetermined area around the vehicle or in the vehicle and is identified as belonging to the vehicle, then the vehicle automatically locks/unlocks its opening elements depending on the user's intention, without the user having to physically manipulate a key.

For this purpose, when the user approaches the vehicle, communication is established on a wireless communication link between the access device, for example an electronic badge or a mobile phone, and the detection device, in order to authenticate said access device, using its identifier.

To this end, the detection device has an antenna for receiving the identifier sent by the access device. The detection device is connected to a computer belonging to the car (known as an ECU, for Electronic Control Unit), to which it transmits the identifier.

In the prior art, the access device is usually an electronic badge. The signal received by the antenna of the detection device, comprising the identifier of the access device, is sent via radio frequency (RF) or low frequency (LF) waves. The precise location of the item of portable equipment around the vehicle is found by measuring the intensity of the LF signal received by the item of portable equipment (via the antennas and the electronic control unit) originating from the vehicle, more commonly called RSSI ("Received Signal Strength Indication") measurements. The measurement of the power of the signal received by the item of portable equipment from each LF antenna is received and analyzed by a detection device on board the vehicle, which thus determines the position of the item of portable equipment relative to said LF antennas, that is to say relative to the vehicle.

According to the location of the item of portable equipment identified by the vehicle, in said location areas certain actions specific to said location areas are automatically executed, such as unlocking/locking or preliminary switch-on of the passenger compartment lighting (also called "welcome lighting").

At the present time, however, it is increasingly common for mobile phones to be used for performing authentication functions, thus avoiding the use of a dedicated electronic badge which limits the number of items of equipment. The majority of mobile telephones do not possess RF or LF communication means. The access and/or hands-free starting system must therefore be adapted to a vehicle before it can also operate with a mobile phone using other communication standards such as ultra-wideband, instead of using only radio frequency and low frequency (RF and LF) radiation. Ultra-wideband (UWB) is a radio modulation technique based on the transmission of pulses with a very short duration, commonly of less than a nanosecond. Thus very high values of bandwidth are achieved.

The approach of the access device to the proximity of the detection device (less than 10 cm away) and the recognition of the identifier received by the computer, combined with the detection of the presence of the user's hand, allows the door to be locked or unlocked.

In order to detect the presence of the user's hand and allow the openable body sections of the vehicle to be unlocked, such a detection device comprises, in a known manner, a capacitive sensor. Usually, a capacitive sensor is dedicated to a detection area, and, in the prior art, there is a capacitive sensor for the unlocking area and a capacitive sensor for the locking area, the two areas being separate.

According to one example of capacitive measurement, such a capacitive sensor comprises a first capacitor that is charged and discharged periodically from/into a second capacitor. When the first capacitor is discharged into the second capacitor, the charges are balanced between the two capacitors.

When a hand is present on the handle or near the handle, less than 10 mm away for example, the charge level of the first capacitor rises. This causes a greater discharge from the first capacitor into the second capacitor, and therefore a higher balance level in the presence of a hand on the handle than in its absence. Thus such a sensor may be used to detect a user's intention to unlock the openable body sections of the vehicle.

However, the use of capacitive sensors presents numerous problems:

Specifically, the detection of the approach of a user by capacitive sensors is not robust and generates false detections.

In particular, in some environmental conditions, when the ambient air is humid, or if salt is present on the roads and is projected onto the metal bodywork of the vehicle, a capacitive coupling is created between the detection areas and the metal parts of the vehicle, preventing any detection of a user's presence by the capacitive sensors.

Moreover, raindrops or snowflakes on the door handle increase the value of the capacitance measured by the capacitive sensors, thus giving rise to false positives.

Lastly, detection by capacitive sensors is incompatible with handles coated with metallic paints or comprising chromed surfaces, the presence of metal in the handle creating a coupling with the detection regions and inhibiting the detection of the presence of a user.

While false detections are undesirable for some vehicles, they are completely unacceptable for other vehicles.

This is the case for vehicles fitted with deployable handles, that is to say the case of handles for which the detection of the presence of the user controls the movement of a motorized handle which, when at rest, is completely incorporated within the door and, when activated, is deployed and projects out of the door. For this type of handle, the unwanted deployment or retraction of the handle due to a false detection by the capacitive sensors risks hitting or squeezing the hand of the user.

This is also the case for vehicles provided with electrically assisted opening, for which the detection of unlocking is accompanied not only by the door being unlocked but also by it opening. In this case, false detections result in unwanted openings of the door.

Finally, the use of capacitive sensors having electrodes made of copper has considerable drawbacks in terms of cost.

SUMMARY OF THE INVENTION

An aspect of the invention therefore proposes a method and a device for activating a vehicle function which can overcome the drawbacks of the prior art. Specifically, the activation method according to an aspect of the invention enables the access device to be located and authenticated by ultra-wideband communication, making it possible not only to dispense with capacitive sensors and eliminate the drawbacks of the prior art arising from the use of capacitive technology as detailed above, but also to reduce the cost of the activation device.

An aspect of the invention proposes a method for activating a function of a motor vehicle, based on a portable access device carried by a user, using an activation device, the activation of the function being initiated by the detection of the user's presence in a predetermined area around the vehicle, on the basis of a result of authentication of the portable access device by the vehicle, the method being remarkable in that:
  a. the detection of the user's presence in the predetermined area is carried out by means of a predetermined profile of ultra-wideband radiation emitted by the activation device, in what is known as ultra-wideband reflective mode, and reflected by the user,
  b. the authentication of the portable device is carried out by two-way ultra-wideband communication between the activation device and the portable access device.

More precisely, the user's presence in a predetermined area is detected by determination of a reflected radiation profile and comparison with a predetermined profile.

Alternatively, the detection of the user's presence in a predetermined area comprises detection of a reflected radiation profile corresponding to a predetermined movement of a limb of the user.

In a preferred embodiment of the method according to the invention, a distance between the user and the activation device is determined on the basis of an instant corresponding to a maximum value of the reflected radiation profile.

The authentication may comprise determination of a distance between the activation device and the portable access device.

More precisely, the distance is determined by a flight time of messages exchanged between the portable device and the activation device in two-way communication during the authentication of the portable device.

An aspect of the invention also relates to a device for activating a vehicle function on the basis of a portable access device carried by a user, the activation device being designed to be placed on board said motor vehicle, the activation of the function being initiated by the detection of the user's presence in a predetermined area around the vehicle, and on the basis of a result of authentication of the portable access device, the activation device being characterized in that it comprises:
  a. An antenna connected to means for transmitting and receiving ultra-wideband radiation,
  b. Means for determining a received ultra-wideband radiation profile and for comparing it with a predetermined profile,
  c. Means for detecting the user's presence in a predetermined area around the vehicle on the basis of the result of the comparison,
  d. Means for authenticating the portable access device by two-way ultra-wideband communication.

The activation device may further comprise means for determining a distance between the user and the activation device on the basis of an instant corresponding to a maximum value of the received radiation profile.

The activation device may further comprise means for determining a distance between the portable access device and the activation device by calculating a flight time of messages exchanged by two-way ultra-wideband communication between the access device and the activation device.

Preferably, the frequency of the ultra-wideband radiation is between 5 GHz and 8 GHz.

An aspect of the invention relates to any motor vehicle door, any handle of a motor vehicle door, or any motor vehicle comprising an activation device according to any of the characteristics stated above.

BRIEF DESCRIPTION OF THE DRAWINGS

Other characteristics and advantages of aspects of the invention will be more readily apparent from a perusal of the following description. This description is purely illustrative and should be read with reference to the appended drawings, in which:

FIG. 1 is a schematic view showing a motor vehicle equipped with the activation device according to an aspect of the invention, FIG. 2 is a schematic view showing a motor vehicle door handle comprising the activation device according to an aspect of the invention.

DETAILED DESCRIPTION OF THE PREFERRED EMBODIMENTS

Figure 3:
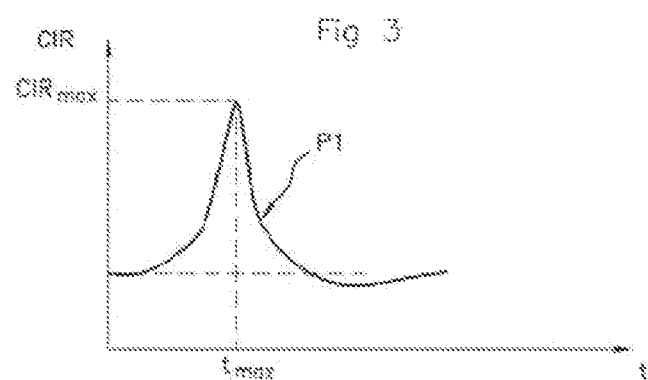
FIG. 3 is a graph showing reflected ultra-wideband radiation in the presence of a user.

FIG. 1 shows a motor vehicle V comprising a device D for activating a vehicle function according to an aspect of the invention. By means of the activation device D according to an aspect of the invention it is possible to:

a. detect the presence of a user U in a predetermined area ZD around the vehicle V, b. authenticate the portable access device SD carried by the user, in order to activate a vehicle function.

"Vehicle function" is taken to mean the locking/unlocking of the openable body sections of the vehicle V, such as the driver's door or the rear trunk of the vehicle V, and also the switching on of heated seats, the switching on of the ceiling lighting (or "welcome lighting"), or the pre-adjustment of seats or pre-tuning of a radio station, even before the user U has entered the vehicle.

For this purpose, the activation device D comprises:

a. An antenna A connected to ultra-wideband radiation transmitting and receiving means M1.

b. Means M2 for determining a profile of received ultra-wideband radiation and comparing it with a predetermined profile P1, P2, P3.

c. Means for detecting the presence M3 of the user U in a predetermined area ZD around the vehicle V on the basis of the result of the comparison, d. Means M4 for authenticating the portable access device SD, by two-way ultra-wideband communication.

Ultra-wideband (UWB) is taken to mean a frequency band preferably lying between 5 GHz and 8 GHz over a frequency range that is preferably 500 MHz.

The ultra-wideband transmission/reception means M1 consist of a transmitter and a receiver, which are known to those skilled in the art and will not be detailed further here. Said transmitted radiation is generated by voltage pulses at a predetermined frequency, once every millisecond for example.

The antenna A and the transmission/reception means M1 enable to exchange signals in ultra wide band with portable access device SD.

The means M2 for determining a received ultra-wideband radiation profile comprise means for determining a parameter called the CIR (Channel Impulse Response), that is to say means for measuring time-sampled received radiation. It should be noted that either the amplitude of the CIR or the phase of the CIR may be used. In this example, the frequency measurements of the received radiation are transformed by the inverse Fourier transform so as to generate values in time units. The amplitude of the CIR consists in the absolute value of the real and imaginary parts of the values in time units. The phase of the CIR consists in the arctangent of the ratio of the imaginary part divided by the part of the values in time units. The calculation of the amplitude or phase of the CIR are well known to those skilled in the art and will not be detailed further here. In the example shown in FIGS. 3, 4 and 5, the parameter considered is the amplitude of the CIR, but an aspect of the invention may be applied, mutatis mutandis, by considering the phase of the CIR. The determination means M2 comprise a clock H for determining the amplitude or phase of the CIR according to the time t. As detailed below, the clock is initiated when radiation is transmitted by the activation device D.

In a particular embodiment of the invention, the activation device D further comprises means M5 (not shown) for determining a distance d between the user U and the vehicle V. In what is called the "reflective" phase of presence detection in ultra-wideband (UWB), the distance d is calculated from the instant tmax when the CIR amplitude value is maximal, CIRmax, using the following formula:

$$d = \frac{tmax}{2} \times c \qquad \text{[Math 1]}$$

For this purpose, the activation device D comprises a clock which is initiated when the radiation is transmitted. The instant of starting the measurement of the time t is the instant of transmission of the radiation by the activation device D.

In the phase of authentication using two-way communication, the activation device further comprises means M6 (not shown) for calculating the distance d' between the portable access device SD and the activation device d, based on the calculation of a flight time tv of messages exchanged by said two-way ultra-wideband (UWB) communication between the access device D and the activation device SD. The distance d' between the portable access device SD and the activation device D is found by multiplying said flight time tv by the speed of sound c.

Detection means M3 are provided in software form, for example.

The authentication means M4 are provided, for example, in a known software form.

The antenna A, the transmission/reception means M1, the determination means M2, the presence detection means M3 and the authentication means M4, the means M5 for determining a distance d and the means M6 for calculating a distance d' may be located on a printed circuit 20 and connected to a microcontroller (not shown).

The activation device D is electronically connected via an electronic link 30 to a central electronic unit 10 on board the vehicle, which unit is itself connected to means for initiating the function. Depending on the information it receives from the activation device D, the presence or otherwise of a user U in a predetermined area ZD, and the success or failure of the authentication of the portable device SD, the central unit 10 then activates the means for initiating the unlocking/locking of the openable body sections, for switching on the heated seats, for pre-adjusting the seats or pre-tuning the radio stations, and so on.

The activation device D is preferably located in the openable body section or near the openable body section if the function to be activated is the locking/unlocking of the openable body section. It may be located in a door handle of the vehicle V, in the door or a door pillar of the vehicle V, or in the fender or near the trunk of the vehicle V.

Depending on the predetermined area ZD around the vehicle V, in which the user U carrying the authenticated access device SD is located, the activation of one or other function may be initiated. FIG. 1 shows only one predetermined area ZD, but evidently there may be a plurality of predetermined areas around the vehicle, each at a different distance from the vehicle and each initiating the activation of a particular function.

Thus the initiation of the seat heating may be launched if the user U carrying the authenticated access device SD is located in an area ZD distant from the vehicle, that is to say several metres away, but unlocking can only be initiated if the user U carrying the authenticated access device SD is located near the openable body section, that is to say within a few centimetres.

Figure 6:
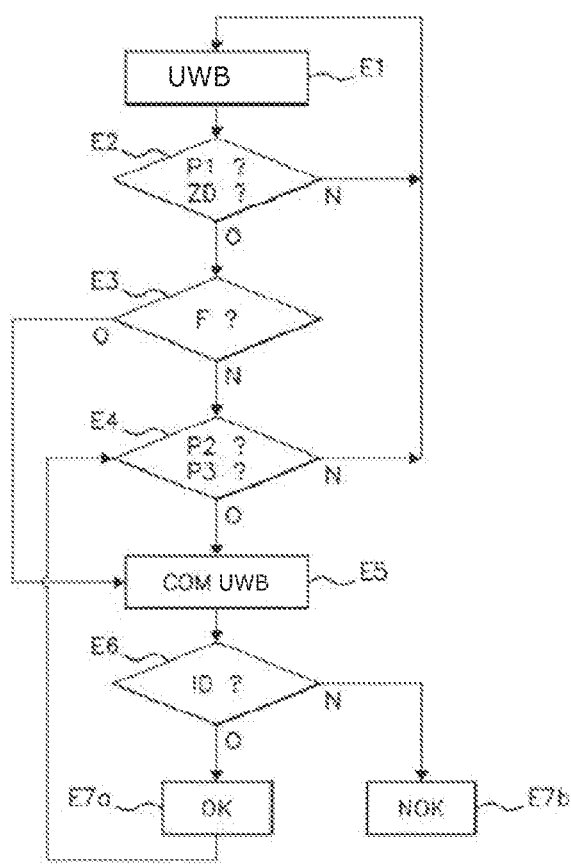
FIG. 6 is a flow diagram showing the various steps of the activation method according to an aspect of the invention.

The activation method according to an aspect of the invention, illustrated in FIG. 6, will now be described.

In a first step E1, the activation device D is put into operation in ultra-wideband mode, called "reflective" mode, in which, more precisely, voltage pulses are generated at a regular frequency, resulting in the transmission of ultra-wideband radio frequency radiation, preferably but not exclusively over a range of 500 Hz at a frequency of between 5 MHz and 8 MHz. By contrast with what is known as the "communication" ultra-wideband mode, this UWB radiation or these signals do not contain any message as such that would require a response from the portable access device SD, but simply comprise an identifier specific to the transceiver of the activation device D, that is to say specific to the activation device D. This identifier enables the activation device D, when UWB radiation is received by said device, to recognize that said radiation that it receives does indeed correspond to the radiation that it has transmitted, and that said radiation has therefore been correctly reflected by any bodies present in its transmission area, particularly a user U.

In a second step E2, a check is made as to whether the user U is in a predetermined area ZD around the vehicle V. For this purpose, the profile of the reflected radiation, received by the activation device D, is analyzed. This is illustrated in FIG. 3; more precisely, the amplitude of the parameter CIR is determined according to the time t. This parameter is well known to those skilled in the art, and will not be detailed further here. FIG. 3 shows a typical profile of the amplitude of CIR of the radiation received as a function of time t when the radiation has been reflected by a human body U. The instant of the start of measurement of the time t is the instant of transmission of the radiation by the activation device D. A clock H included in the activation device D may be used to measure the time t between the transmission of the radiation and its reception. The profile P1 shows a peak with a maximum value of amplitude CIRmax. The instant tmax when the value of amplitude of CIR is maximal, CIRmax, may be used to determine the distance d between the activation device D and said human body, using the following formula:

$$d = \frac{tmax}{2} \times c \quad \text{[Math 1]}$$

Where c is the speed of sound, i.e. $3 \times 10^8$ m/s.

Tmax is the instant when the maximum value of amplitude of CIR is reached

It is considered that, if the profile P1 corresponds to the predetermined profile, that is to say a profile including a peak, then the radiation has been reflected by a body. By calculating tmax, it is thus possible to determine whether this body U is located in a predetermined area ZD around the vehicle V. It should be noted that the phase of the parameter CIR may be used in place of the amplitude of the parameter CIR.

If a body U is located in the predetermined area ZD, and if the activation of a function F is possible in this area (step E3), then the authentication of the portable device SD takes place (step E5); otherwise, the profile of the reflected radiation is compared with other predetermined profiles, as explained below.

In step E5, the activation device D switches from the reflective UWB mode to a two-way communication UWB mode. By contrast with the reflective UWB mode, in which the signals sent do not comprise any message, but simply an identifier specific to the transceiver (or to the activation device D), and in which the mode of operation resembles that of radar, the two-way communication UWB mode allows messages to be exchanged between the activation device D and the portable access device SD. More precisely, the activation device D sends a UWB message to the portable access device SD, including an authentication request. A check is then made as to whether the identifier returned by the portable device SD corresponds to an identifier pre-recorded by the vehicle V and previously paired with the latter (step E6).

If the portable access device SD is correctly authenticated, the function is activated (step E7a); otherwise the function is not activated (step E7b).

It should be noted that, during this two-way communication phase, it is possible to determine the distance d' between the activation device D and the portable access device SD. The distance d' is then determined by calculating the time of flight tv corresponding to the duration between the instant of transmission of the message sent by the activation device D and the instant of reception of the response message from the portable access device SD by the activation device D. By multiplying this time of flight tv by the speed of sound c, the distance d' between said two devices is found. During the authentication phase it is therefore possible to check whether the portable access device SD is indeed near the vehicle V.

If, at the end of step E2 of determining the presence of the user U in the predetermined area ZD, no function F can be activated in said area (or even if a function F has been activated), then the profile of the reflected radiation is compared with other predetermined profiles P2, P3. This is illustrated in FIGS. 4 and 5.

It should be noted that, even if a function has been activated at the end of the preceding steps (step E7a), and after the detection of the user U in the predetermined area ZD, the method may continue by executing step E4 and comparing the profile of the reflected radiation with the other profiles P2, P3, for the purpose of activating other functions, particularly the unlocking of the openable body sections. This is shown by an arrow linking step E7a to step E4.

Figure 4:
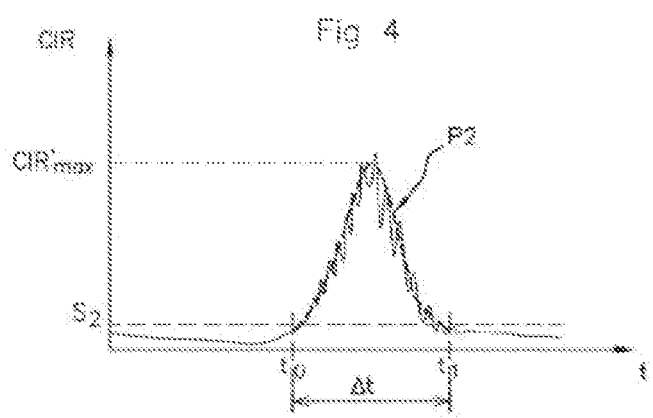
FIG. 4 is a graph showing a profile of reflected ultra-wideband radiation when a user's hand approaches the activation device, according to a first embodiment of the invention.

FIG. 4 shows a profile of amplitude of CIR P2 of the reflected radiation as a function of time t, corresponding to the approach of a hand to the activation device D near a door handle P of the vehicle V, in the case where the device is located in said handle P. This profile P, which is typical of this kind of approach, comprises the exceeding of a threshold value S2 for a predetermined duration Δt, together with a peak of maximum amplitude CIRmax' for said duration.

Figure 5:
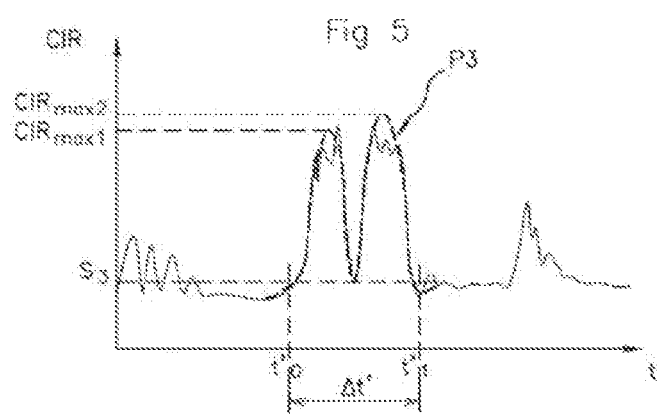
FIG. 5 is a graph showing a reflected ultra-wideband radiation profile during a predetermined movement of a limb of the user's body toward the activation device, according to a second embodiment of the invention.

FIG. 5 shows a profile of amplitude of CIR P3 typical of reflected radiation as a function of time t, corresponding to a predetermined movement of the body of the user U facing the activation device D. More precisely, the profile P3 of FIG. 5 corresponds to an out and return movement, also called a "kick", of the lower leg of the user U in front of a fender of the motor vehicle V in which the activation device D is located. The profile P3 comprises the exceeding of a threshold value S3 for a predetermined time interval Δt', as well as two peak values of amplitude CIRmax1 and CIRmax2 during said time interval. If the profile of amplitude of CIR for the reflected radiation corresponds to this predetermined profile, it is considered that the user U has performed the predetermined out and return movement with his leg before the fender of his vehicle V. It should also be noted that, for FIGS. 4 and 5, the phase of the CIR may be used in place of the amplitude of the CIR.

If the predetermined movement has been detected, the portable access device SD is then authenticated in step E5 as described above.

If the portable device SD is authenticated, the method proceeds with the activation of the function (step E7a); in this example, this is the opening of the trunk of the vehicle V, otherwise the function is not activated (step E7b).

An aspect of the invention therefore makes it possible to overcome the drawbacks of the prior art in an ingenious manner, by using ultra-wideband in two different modes, namely the reflective mode and the two-way communication mode. In particular, an aspect of the invention allows a vehicle to be accessed with a user's mobile phone, while dispensing with the capacitive sensors for approach detection used in the prior art, which are costly and give rise to problems of reliability.

The invention claimed is:

1. A method for activating a function of a motor vehicle using an activation device, based on a mobile device carried by a user, the activation of the function being initiated by detection of the presence of the user in a predetermined area around the vehicle, and on the basis of the result of authentication of the mobile device by the vehicle, the method comprising:
   a) transmitting, by the activation device comprising an antenna connected to an ultra-wide band radiation transmitter and receiver, ultra-wideband radiation in a reflective ultra-wideband mode reflected by a body of the user carrying the mobile device, said ultra-wideband radiation comprising only an identifier specific to a transceiver of the activation device,
   b) detecting the presence of the user in the predetermined area by analyzing a predetermined profile, the predetermined profile comprising at least one peak of the ultra-wideband radiation transmitted by the activation device and reflected by the body of the user carrying the mobile device,
   c) determining a distance between said activation device and the body of the user carrying the mobile device based on an instant corresponding to a maximum amplitude of the at least one peak of the ultra-wideband radiation, and
   d) authenticating the mobile device by two-way ultra-wideband communication between the activation device and the mobile device based on locating of the body of the user carrying the mobile device in the predetermined area, wherein the two-way ultra-wideband communication enables messages to be exchanged between said activation device and the mobile device.

2. The activation method as claimed in claim 1, wherein the detecting the presence of the user in the predetermined area comprises detection of a reflected radiation profile corresponding to a predetermined movement of a limb of the user.

3. The activation method as claimed in claim 1, wherein the authenticating comprises determination of a distance between the activation device and the mobile device.

4. The activation method as claimed in claim 3, wherein the distance is determined by a time of flight of messages exchanged between the mobile device and the activation device in two-way communication during the authentication of the mobile device.

5. A device for activating a vehicle function based on a mobile device carried by a user, the activation device being designed to be placed on board said motor vehicle, the activation of the function being initiated by the detection of the presence of the user in a predetermined area around the vehicle, and on the basis of a result of authentication of the mobile device, the activation device comprising:
   a) An antenna connected to ultra-wide band radiation transmission and reception means,
   b) Means for determining a profile of received ultra-wideband radiation and for comparing the profile with a predetermined profile comprising at least one peak of the ultra-wideband radiation,
   c) Means for detecting the presence of a body of the user carrying the mobile device in a predetermined area around the vehicle on the basis of the result of the comparison,
   d) Means for determining a distance between the body of the user carrying the mobile device and the activation device on the basis of an instant corresponding to a maximum value of the at least one peak of the ultra-wideband radiation reflected by the body of the user carrying the mobile device, and
   e) Means for authenticating the mobile device by two-way ultra-wideband communication based on detecting the presence of the body of the user carrying the mobile device in the predetermined area.

6. The activation device as claimed in claim 5, further comprising means for determining a distance between the mobile device and the activation device by calculating a time of flight of messages exchanged by two-way ultra-wideband communication between the mobile device and the activation device.

7. The activation device as claimed in claim 5, wherein a frequency of the ultra-wideband radiation lies between 5 GHz and 8 GHz.

8. A door for a motor vehicle, comprising an activation device as claimed in claim 5.

9. A door handle for a motor vehicle, comprising an activation device according to claim 5.

10. A motor vehicle, comprising an activation device as claimed in claim 5.

* * * * *